United States Patent
Dwivedi et al.

(10) Patent No.: US 11,767,180 B1
(45) Date of Patent: Sep. 26, 2023

(54) SYSTEMS AND METHODS TO PERFORM PERPENDICULAR CHANGES IN CONTAINER SHUTTLE DIRECTION

(71) Applicant: Amazon Technologies, Inc., Seattle, WA (US)

(72) Inventors: Rajeev Dwivedi, Sammamish, WA (US); Vivek S. Narayanan, Franklin, TN (US); Ganesh Krishnamoorthy, Seattle, WA (US); Mohit Malik, Seattle, WA (US); Michael Alan Bray, Elkhorn, NE (US)

(73) Assignee: Amazon Technologies, Inc., Seattle, WA (US)

( * ) Notice: Subject to any disclaimer, the term of this patent is extended or adjusted under 35 U.S.C. 154(b) by 136 days.

(21) Appl. No.: 17/532,711

(22) Filed: Nov. 22, 2021

(51) Int. Cl.
 *B65G 54/02* (2006.01)
 *B65G 35/06* (2006.01)
 *H02K 41/035* (2006.01)
 *H02K 41/02* (2006.01)

(52) U.S. Cl.
 CPC .............. *B65G 54/02* (2013.01); *B65G 35/06* (2013.01); *H02K 41/02* (2013.01); *H02K 41/0356* (2013.01)

(58) Field of Classification Search
 CPC ........ B65G 54/02; B65G 35/06; H02K 41/02; H02K 41/03; H02K 41/0356
 USPC ........................................................ 198/805
 See application file for complete search history.

(56) References Cited

U.S. PATENT DOCUMENTS

| | | | |
|---|---|---|---|
| 6,265,839 B1 * | 7/2001 | Layton ................... | B23Q 7/005 318/135 |
| 11,492,211 B1 * | 11/2022 | Bray ...................... | B65G 54/02 |
| 2002/0064442 A1 * | 5/2002 | Ahn .................. | H01L 21/67706 414/373 |
| 2005/0095087 A1 * | 5/2005 | Sullivan ............ | H01L 21/67736 414/217 |
| 2017/0183170 A1 * | 6/2017 | Wernersbach ....... | B65G 47/648 |
| 2018/0237232 A1 * | 8/2018 | Wernersbach ....... | B65G 54/025 |
| 2021/0371205 A1 * | 12/2021 | Mutarelli ............. | B65G 1/0492 |

FOREIGN PATENT DOCUMENTS

| | | | | |
|---|---|---|---|---|
| CN | 101175682 B | * | 7/2012 | ............. B65G 37/02 |
| CN | 105712048 A | * | 6/2016 | ............. B65G 35/06 |

* cited by examiner

*Primary Examiner* — James R Bidwell
(74) *Attorney, Agent, or Firm* — Eversheds Sutherland (US) LLP

(57) ABSTRACT

Systems and methods are disclosed for shuttle turning systems having linear synchronous motors. In one embodiment, an example system for shuttle transportation may include a first linear synchronous motor arranged in a first orientation, a second linear synchronous motor arranged in a second orientation that is transverse to the first orientation, and a shuttle. The shuttle may have a first permanent magnet coupled to the shuttle and a second permanent magnet coupled to the shuttle, where the first permanent magnet is arranged parallel to the first orientation and the second permanent magnet is arranged parallel to the second orientation. The shuttle may be configured to be propelled in a first direction via the first linear synchronous motor and the first permanent magnet, and to be propelled in a second direction via the second linear synchronous motor and the second linear synchronous motor.

20 Claims, 9 Drawing Sheets

SYSTEMS AND METHODS TO PERFORM PERPENDICULAR CHANGES IN CONTAINER SHUTTLE DIRECTION

BACKGROUND

As users increasingly make online purchases, fulfillment of such purchases and other orders may become increasingly complicated. For example, a fulfillment center may have output of upwards of one million packages per day. With such demands, efficiency of logistics related to processing orders and packages may be important. For example, use of equipment to move or otherwise handle objects may improve efficiency. However, such equipment may create chokepoints or cause bottlenecks in fulfillment center operations. Accordingly, improvements in various operations and components of order fulfillment, such as improvements to picking technology, sorting technology, transport technology, packing technology, and so forth may be desired, such that manual efforts can be redirected to different tasks.

Figure 1:
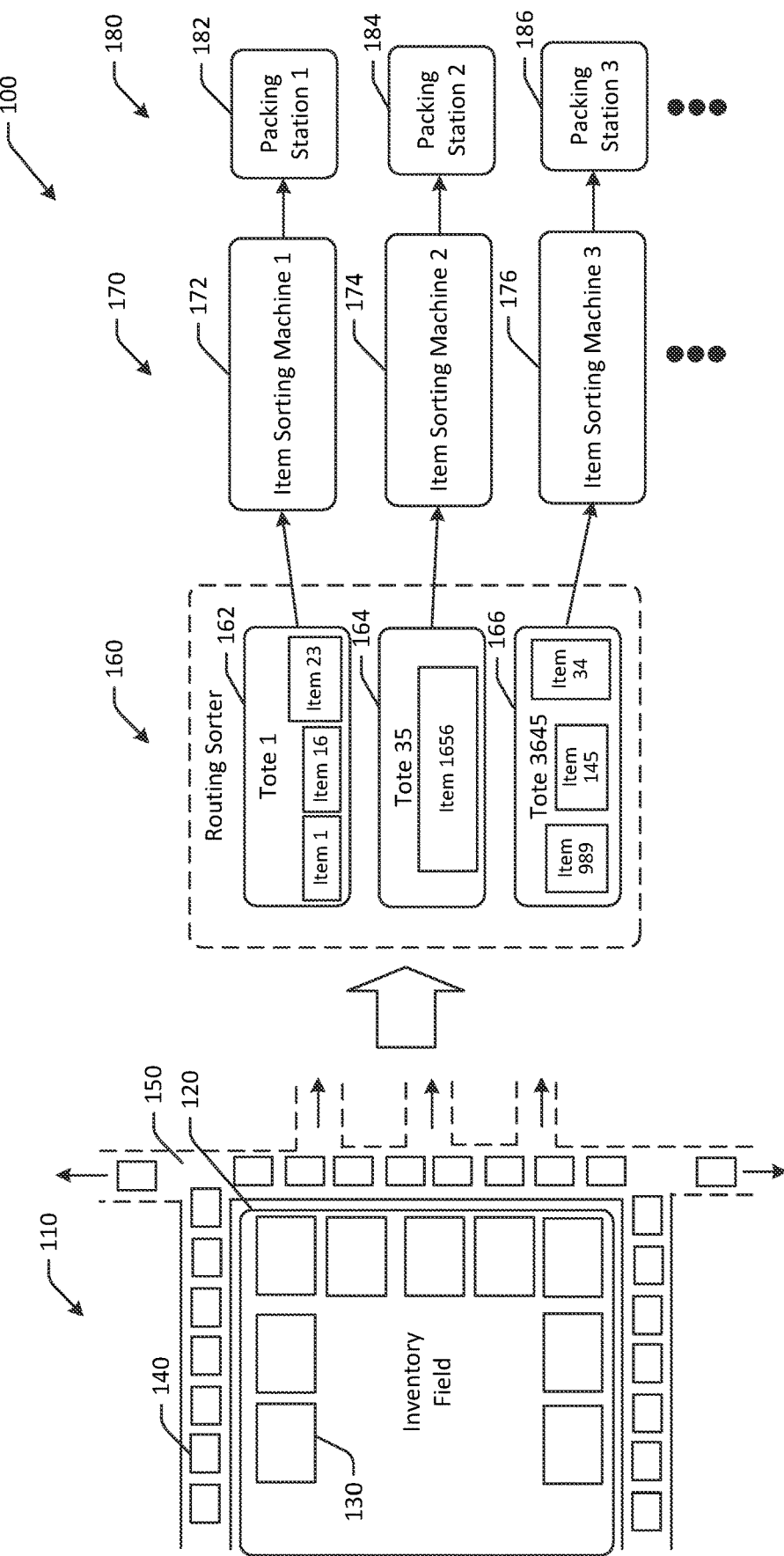
FIG. 1 is a hybrid schematic illustration of an example use case for container shuttles having omnidirectional wheels in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. Humans may be able to manually handle individual items with ease. However, robotic handling of individual items may require various levels of dexterity. Moreover, fulfillment centers may include lengthy conveyors that may be used to transport objects, such as packages, products, items, or other objects, as well as containers that may be at least partially full of objects. Transport of containers or items (e.g., individual items or multiple items, etc.) may involve the use of container shuttles that move on one or more rails to transport a container from one location to another. For example, a container of items may be loaded onto a shuttle, and the shuttle may autonomously transport the container from an inventory field to a sortation system or other location. Movement of container shuttles along rails may be difficult in that the shuttle may have to execute a turn or may otherwise have to switch or shift from one set of rails to another. Switching between rails may be difficult due to high utilization of switching components, a frequency of switching operations to be performed by switching hardware, and low clearance space for magnet-driven shuttles.

Embodiments of the disclosure include container shuttle systems that allow for open space or free motion directional changes of shuttles, including orthogonal turns, without shuttle rails. Embodiments further include container shuttles that are configured to execute turns or other directional changes while riding on rails. Some embodiments include container shuttles with omnidirectional wheels, such as ball-in-cup types of wheels, that allow for the container shuttles to move in any direction (e.g., 360 degrees, etc.) in free space, as well as to change a direction of travel 90 degrees (e.g., a stop and turn movement without having to rotate, etc.).

In some shuttle on rail systems, positional accuracy and wheel longevity can be improved by placing wheels on that shuttle, where the wheels engage with rails. In addition, by matching a prismatic wheel profile to that of the rail, positional accuracy is maintained along straight rail segments. Along curved rail segments, however, typically wheels have features to accommodate for the effective engagement width proportional to the wheel curvature. In contrast, embodiments of the disclosure include container shuttles having omnidirectional wheels, which may be in the form of spherical caster rollers, that eliminate the wheel width dependency on the roller curvature. Embodiments therefore improve the contact between the wheels and rail surface due to point contact, and also are improved over typical systems because an axis of rotation is not fixed. Further, embodiments may include omnidirectional wheels that are passive wheels, and therefore do not require active motor or power sources on the wheel. Some embodiments include linear synchronous motor systems for propulsion, and allow for fully constrained shuttle movement and travel along straight segments as well as curved segments of rail, and in free space. Some embodiments further include more than one permanent magnet and/or a rotatable permanent magnet to execute 90 degree turns, thereby allowing for tracks or rails that consume less space in a facility and reduce overall system footprints.

In addition, embodiments of the disclosure include container shuttle systems that may be used to transport containers from one location or system of a fulfillment center to another. For example, embodiments of the disclosure may include one or more rails and/or open spaces configured to facilitate transfer of a container shuttle from one set of rails to another. In some embodiments, the rails and/or open spaces may allow for shuttles to make turns or to otherwise move from rails in one direction to rails in another direction, while maintaining the ability for the shuttle to be powered by electromagnets or other hardware. As a result of the durability and movement flexibility provided by the systems described herein, flexibility of the processing of items at the fulfillment center may be increased, such as by providing the ability to connect systems that may otherwise be disconnected. For example, an induction system may be coupled to a sortation system via the shuttle rail systems described herein. In addition, throughput of the fulfillment center may be increased and overall efficiency may be improved.

In a typical warehouse environment, such as that illustrated in FIG. 1, items may be transported through various means such as conveyors, belts, shuttles, etc. as they undergo different operations like picking, sorting, storing, shipping/dispatch, and so forth. In some of these cases, containers may be used to transport items, either individually or in groups, from one location to another. For instance, transporting items from a pick station to a sort station may involve the item(s) being picked into a container, such as a tote, which may then be transported via a shuttle.

Embodiments of the disclosure include methods and systems for container shuttles having omnidirectional wheels that may improve processing and fulfillment of orders. Certain embodiments include rail systems and/or open spaces that are configured to redirect a shuttle from one path or set of rails to another. For shuttle rail arrangements that are limited by space, or instances where the conformity of rail bend is critical, embodiments of the disclosure may provide improved performance and/or less error as a result of improved shuttle turning and/or redirection systems and methods. Some embodiments include optimized process flows for processing of orders at fulfillment centers, as well as process flows or methods to increase speed of consolidating products in a multi-item order as a result of improved speed in placing items into containers and removing items from containers. As a result, throughput of fulfillment centers may be improved, and/or logistics of fulfillment center operations may be less complicated.

Referring to FIG. 1, an example use case 100 for container shuttles having omnidirectional wheels is depicted in accordance with one or more embodiments of the disclosure. Although discussed in the context of online orders, other embodiments may be directed to any suitable use case where containers are transported, such as instances where objects are picked from inventory, placed into containers, containers are transported, and so forth.

In FIG. 1, a fulfillment center may be a traditional fulfillment center and may include an inventory field 110, a routing sorter 160, one or more item sorting machines 170, and one or more packing stations 180. The inventory field 110 may include a storage platform, or a portion of the fulfillment center at which products picked from product inventory are placed. Robots may be used to pick products from inventory and to deliver to the robotic storage platform in some instances, while in other instances, manual labor or a combination thereof may be used to pick products. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include robotic components, or a combination thereof. In some instances, picking of items from the inventory field 110 may be completed by robots that include automated robotic arms, where the items are delivered to the picking stations 130 after being retrieved from the inventory field 110. Any number of picking stations 130 may be included, and the picking stations 130 may be located in a different position than that illustrated in FIG. 1.

In a traditional fulfillment center, such as that illustrated in FIG. 1, one or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more containers, such as totes 140. For example, as totes 140 move along the conveyors 150, items may be moved from the picking stations 130 into respective totes 140. The totes 140 may be associated with particular item sorting machines, and may be moved using the conveyors 150 to a routing sorter 160. In contrast, embodiments of the disclosure may not include some or all of the conveyors 150, and instead may include rails and/or open spaces that may be used to guide shuttles from one location to another. The rails may support container shuttles having omnidirectional wheels that allow for shuttles to move from a set of rails oriented in one direction to another set of rails.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may optionally guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Some or all of the item sorting machines may be associated with one or more packing stations 180 that may be used to pack items into a shipment when a single or multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time.

At any of the stages of the example fulfillment process of FIG. 1 where handling of containers is used, container shuttles having omnidirectional wheels systems and methods as described herein may be used. As a result, manual effort can be redirected to other tasks.

Embodiments of the disclosure include systems and methods for container shuttles having omnidirectional wheels. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
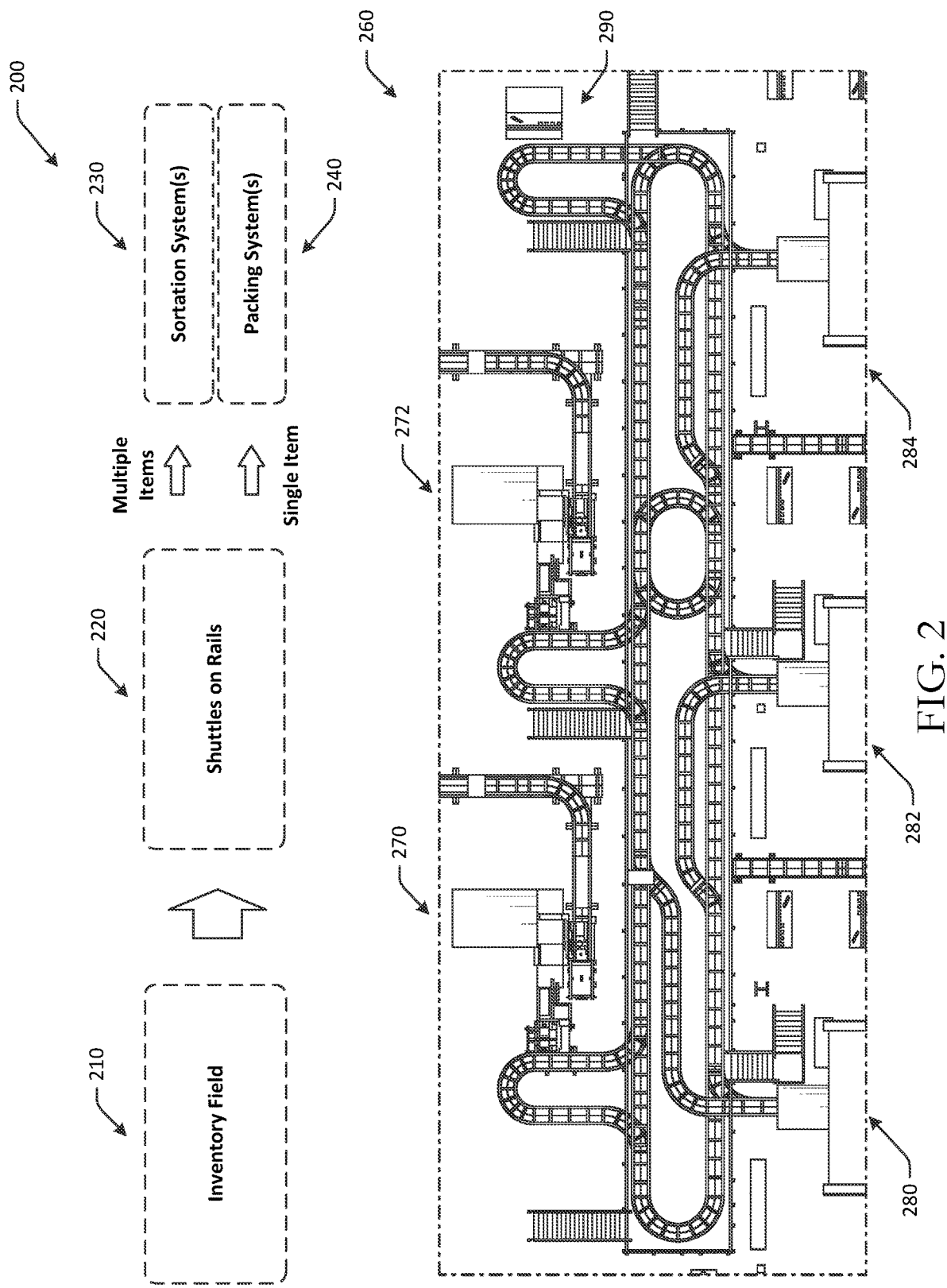
FIG. 2 is a schematic illustration of an example process flow and facility layout for container shuttles having omnidirectional wheels in accordance with one or more embodiments of the disclosure.

FIG. 2 is a schematic illustration of an example process flow 200 and facility layout for container shuttles having omnidirectional wheels in accordance with one or more embodiments of the disclosure. Other embodiments may include additional or fewer components. The illustration of FIG. 2 may not be to scale, and may not be illustrated to scale with respect to other figures.

In FIG. 2, a fulfillment center may include an inventory field 210, at which products or other items may be stored in inventory. As the items are ordered in online orders, the products may be picked from the inventory field 210 and routed for downstream processing in the fulfillment center. The items may be picked manually, using vehicles, or a combination thereof.

The picked products may be placed into one or more containers and the containers may be transported using one or more shuttles, such as one or more shuttles on rails 220. The shuttles on rails 220 may include container shuttles that are configured to transport items and/or containers from one location to another via rails. The rails may include rails with 90 degree turns and/or one or more open spaces that allow for the shuttles to move from one set of rails to another. The shuttles on rails 220 may transport containers from the inventory field 210 to one or more downstream processes, such as a sortation system 230, or a packing system 240. For example, the sortation system 230 may be a system at which items picked from the inventory field 210 may be re-sorted into respective totes or other containers for particular orders. For example, items for different orders may be placed into containers that are transported by the shuttles on rails 220 from the inventory field 210. The containers may be sent to the sortation system 230 for sorting into particular orders. The packing system 240 may be a station at which one or more items associated with an order may be packed into a box or other container for shipment. A shipping label may be applied and the package may be dispatched to a loading dock or elsewhere for shipment. Other destinations or downstream processes in addition to, or instead of, the sortation systems and packing systems may be used.

A rail system 260 is depicted in schematic view in FIG. 2. The rail system 260 is an example of a network of rails that may be used by shuttles to transport containers from one location to another. The network of rails may include locations at which a shuttle can be directed to a straight path or to a loop, turn, oval, circle, and/or other geometries that involve a change in direction of a shuttle on the rails. Such changes in direction may be implemented using the flexible rail switching components described herein. The rail system 260 may include rails that link various systems, such as sortation systems, to each other and/or to other systems, such as container handling systems, manual induction systems 290, and so forth. For example, the rail system 290 may link a first sortation system 270 to a second sortation system 272, as well as to a first container handling system 280, a second container handling system 282, a third container handling system 284, and so forth. The rail system 260 may be used to connect any of the systems to each other and/or other systems.

Shuttles may move along the rails of the rail system 260. The shuttles may include linear drive motor or other drive components. Some drive components may provide a drive force via electromagnetism. As a result, one or more electromagnets may be disposed along the network of rails. Shuttles may optionally include a conveyor belt that may have a first set of one or more raised flaps and a second set of one or more raised flaps. The first set of raised flaps may form a first barrier along a first open-ended side of the shuttle, and the second set of raised flaps may form a second barrier along a second open-ended side of the shuttle to prevent items rolling off the conveyor belt. The shuttles may optionally include an on-board drive motor configured to move the conveyor belt in a forward direction and/or a reverse direction. The shuttles may include a magnet disposed on a lower surface of the shuttle. The magnet may be used to propel and/or secure the shuttle. For example, the magnet may prevent the shuttle from moving while the vehicle is in motion and the linear drive motor is engaged. To onboard or offload containers, the linear drive motor of the shuttle or other component may be used in conjunction with the magnet to impart motion.

Figure 3A:
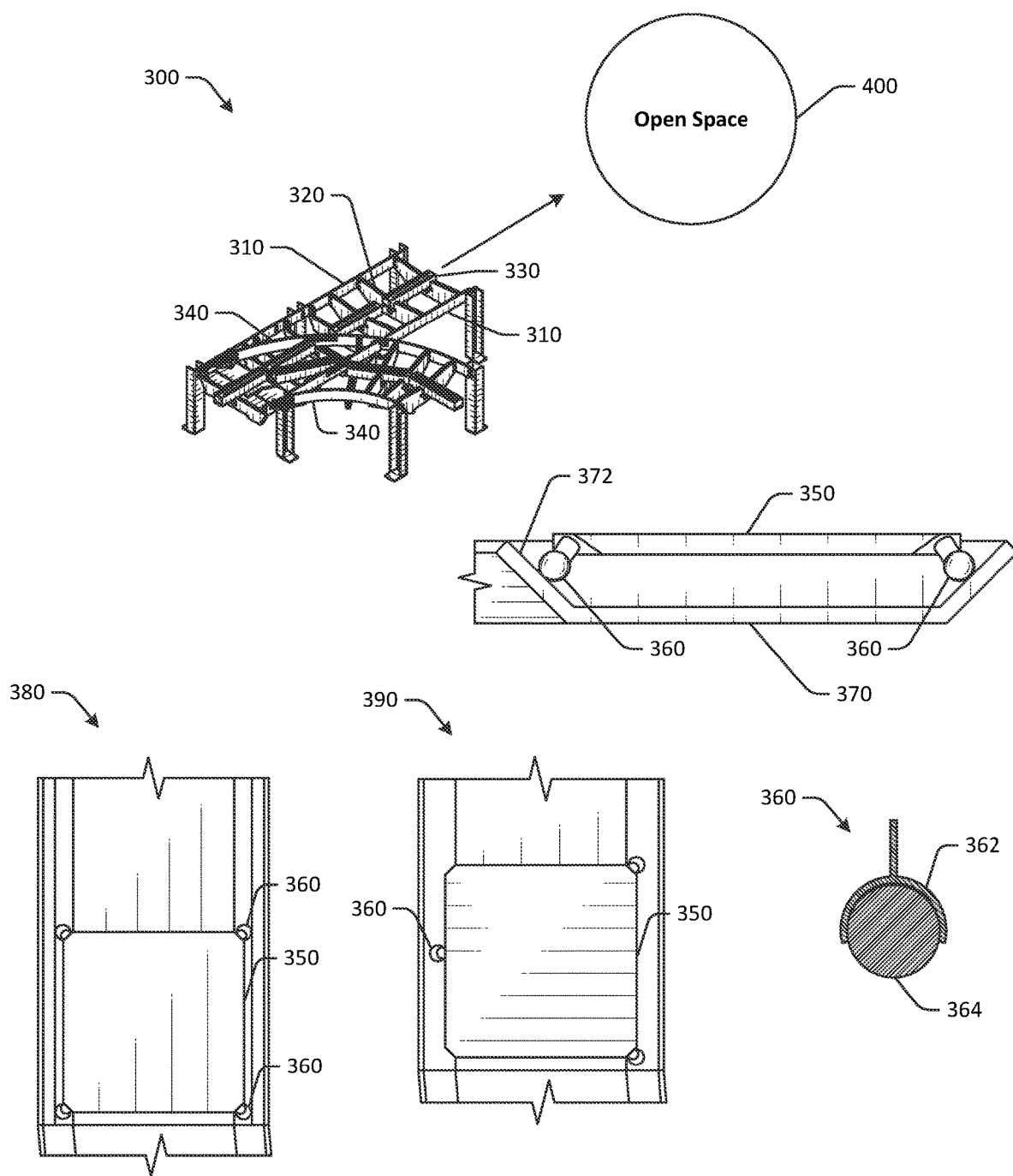
FIGS. 3A-3B are schematic illustrations of various views of a shuttle rail system and a shuttle having omnidirectional wheels in accordance with one or more embodiments of the disclosure.
Figure 3B:
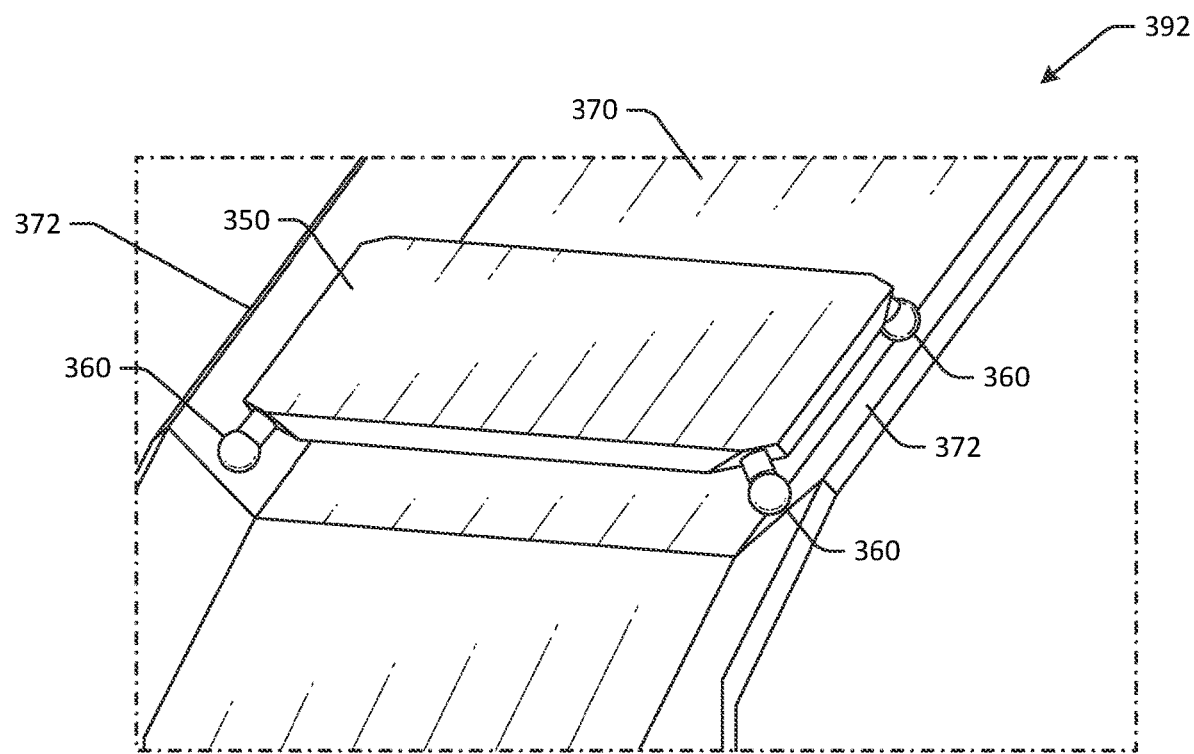

FIGS. 3A-3B are schematic illustrations of various views of a shuttle rail system 300 and a shuttle having omnidirectional wheels in accordance with one or more embodiments of the disclosure. Other embodiments may include additional or fewer components. The illustrations of FIGS. 3A-3B are not to scale, and may not be illustrated to scale with respect to other figures. The systems illustrated in FIGS. 3A-2B may include the same container shuttles having omnidirectional wheels discussed with respect to FIGS. 1-2, and/or may be used with any of the systems described herein.

In FIG. 3A, the shuttle rail system 300 may include one or more sets of rails on which shuttles may ride. The rails may guide shuttles to various locations. Each set of rails may include two rails, so as to support two sides of a shuttle on the rails. The shuttle rail system 300 may include a number of supports 320 disposed between the two rails of a set of rails. A number of electromagnets 330 may optionally be disposed along the rails at various intervals.

Figure 3B:
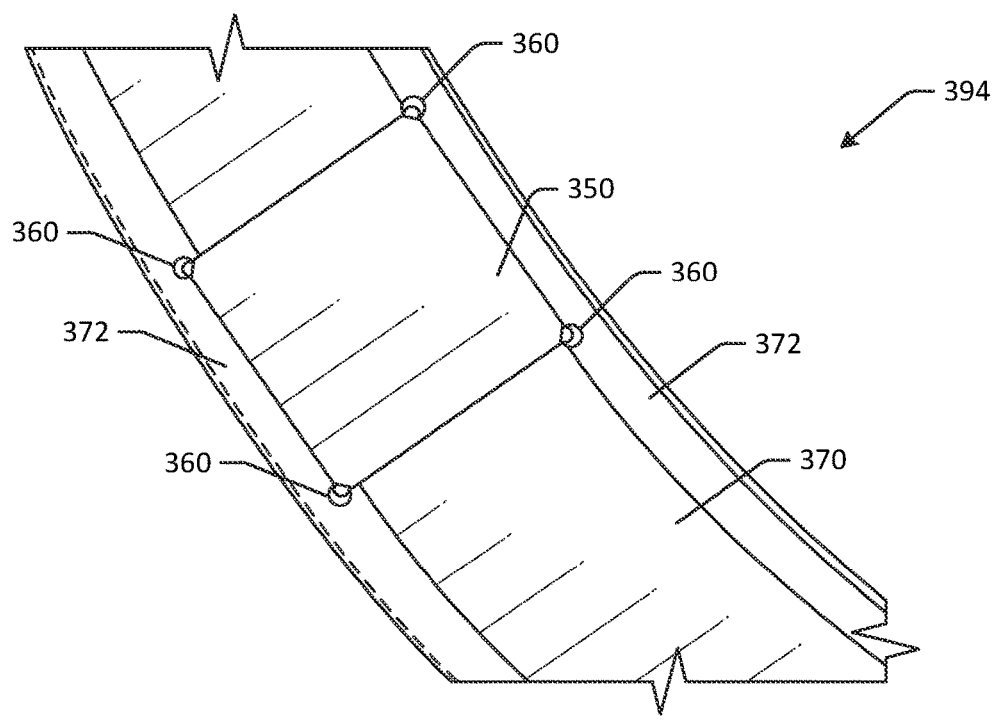

The shuttle rail system 300 may replace one or more switch points, such as that illustrated in FIG. 3 with curved rails 340, with orthogonal rails and/or open space 400 to allow for shuttles to change direction. For example, to travel in a straight direction, the shuttle may travel along a first set of rails 310, and to travel in a different direction (e.g., curve, turn, etc.), instead of using the curved rails 340, the shuttle may travel into the open space 400 and change direction as described in detail with respect to FIG. 4.

A shuttle 350 may move along the rails of the shuttle rail system 300. The shuttle 350 may include one or more omnidirectional wheels 360. The omnidirectional wheel 360 is depicted in isolated cross-sectional view in FIG. 3A. The omnidirectional wheel 360 may be any suitable omnidirectional wheel, such as a spherical caster wheel. In some embodiments, the omnidirectional wheel 360 may have a ball 364 in a socket 362 configuration. The omnidirectional wheel 360 may allow for the shuttle 350 to move in various directions without first rotating. For example, the omnidirectional wheels 360 may allow for the shuttle 350 to make a 90 degree turn without having to rotate the shuttle 350. The omnidirectional wheels 360 may also allow for the shuttle 350 to make turns of zero radius in the open space 400.

The shuttle 350 may include two omnidirectional wheels 360 in some embodiments, whereas in other embodiments, the shuttle 350 may include four omnidirectional wheels for four point contact between the shuttle and the rails, or three omnidirectional wheels for three point contact between the shuttle and the rails. For example, in top view 380, the shuttle 350 may include four omnidirectional wheels that may be engaged on the rails with four points of contact between the four omnidirectional wheels 360 and the rails. In top view 390, the shuttle 350 may include three omnidirectional wheels that may be engaged on the rails with three points of contact between the three omnidirectional wheels 360 and the rails.

As depicted in partial cross-sectional view in FIG. 3A, the omnidirectional wheels may be coupled to the shuttle 350 such that the shuttle wheels engage angled surfaces 372 formed by the rails 370. As a result, the shuttle 350 may be vertically separated from a lower surface of the track on which the electromagnets 330 are disposed. In addition, an angle of the angled surfaces 372 may be modified without impacting functionality, as the omnidirectional wheels may be able to create contact with the angled surfaces 372 at different angles due to the spherical nature of the wheels, thereby allowing for design flexibility.

In some embodiments, to improve the wheel accuracy, a ridge may be added to the tracks or rails. With no physically constrained wheel axis, the shuttle 350 can transfer onto another rail intersecting with the immediate path of the shuttle, thereby reducing a footprint of the system.

In FIG. 3B, a perspective view 392 depicts the shuttle 350 moving along a curved section of rail. The omnidirectional wheels 360 maintain point contact with the angled surfaces 372 of the track or rails 370 as the shuttle 350 moves along the curve. As depicted in a top view 394 of the curved section of rail, the shuttle 350 may maintain contact between the omnidirectional wheels 360 and the angled surfaces 372 regardless of the angle of the angled surfaces and/or the amount of rail curvature. In some embodiments, at least one of the omnidirectional wheels 360 may be adjustable with respect to a frame of the shuttle 350. For example, the angle at which the omnidirectional wheel 360 may be adjusted manually or automatically, such that three-point or four-point contact is maintained between the omnidirectional wheels 360 and the angled surfaces 372. Other embodiments may include a single adjustable omnidirectional wheel.

Accordingly, in some embodiments, the shuttle rail system 300 may include a shuttle 350 that may include a permanent magnet and a plurality of omnidirectional wheels 360, where the shuttle is configured to transport individual items and/or containers of items. The permanent magnet may interact with electromagnets 330 to propel the shuttle 350. In some embodiments, as discussed with respect to FIG. 7, the permanent magnet may have a first width that is at least half a second width of the shuttle 350. In some embodiments, the shuttle 350 may not have an onboard power source, as shuttle movement and/or propulsion may be implemented using linear synchronous motors. In some embodiments, the shuttle 350 may include two omnidirectional wheels, while in other embodiments, the shuttle 350 may include three omnidirectional wheels or four omnidirectional wheels. Other embodiments may have different numbers of omnidirectional wheels.

The shuttle rail system 300 may include one or more tracks formed by rails. For example, the shuttle rail system 300 may include a first track having a first incline angle configured to support the at least three omnidirectional wheels of the shuttle 350. The shuttle rail system 300 may include a second track having a second incline angle configured to support the at least three omnidirectional wheels of the shuttle 350. The at least three omnidirectional wheels of the shuttle 350 may be configured to move directly from the first track to the second track without adjustment, thereby allowing flexibility for track configuration and/or compatibility with different shuttle destination systems.

Figure 4:
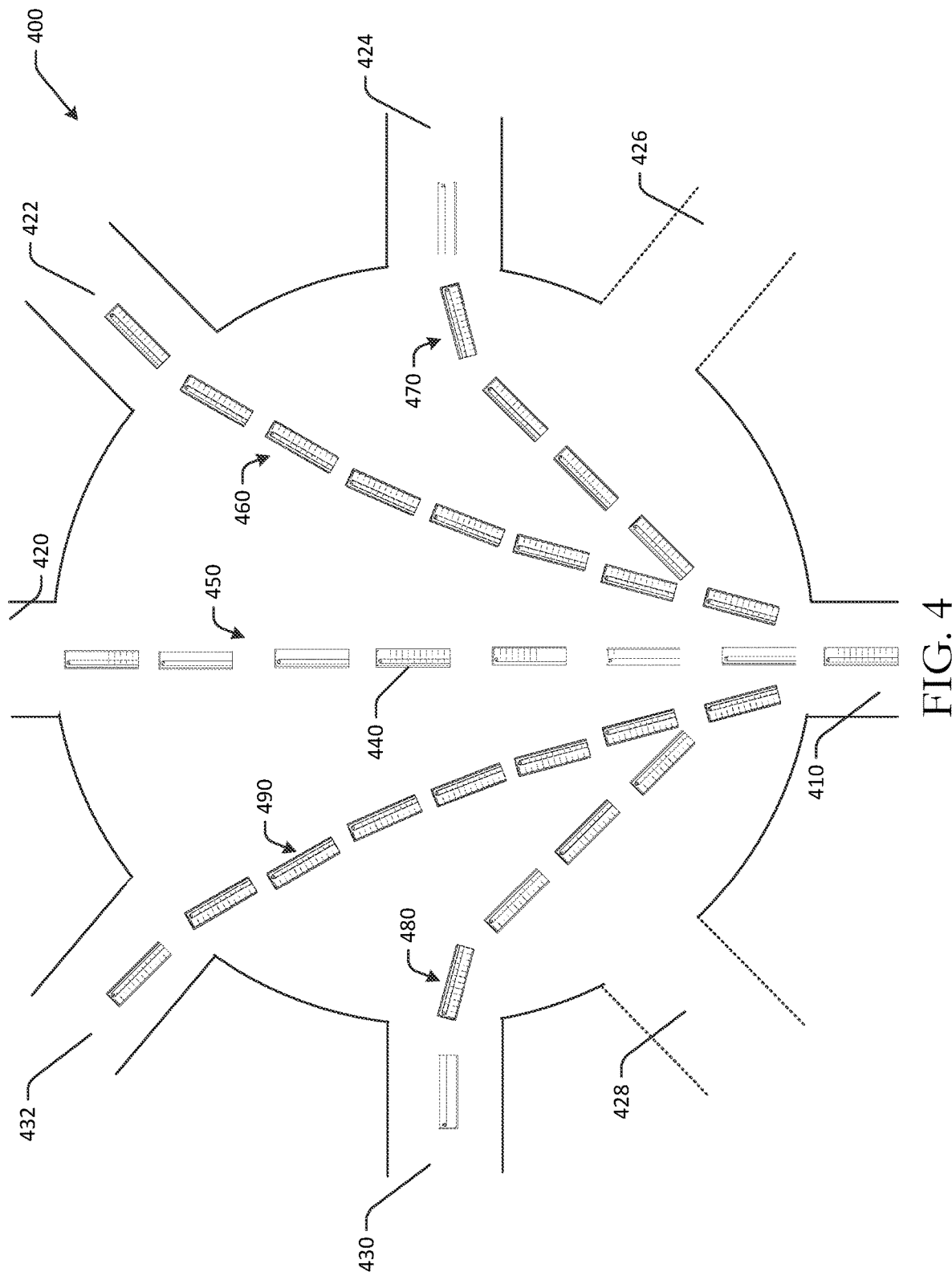
FIG. 4 is a schematic illustration of a top view of an open space for shuttle direction changes in accordance with one or more example embodiments of the disclosure.

FIG. 4 depicts a schematic illustration 400 of a top view of an open space 400 for shuttle direction changes in accordance with one or more example embodiments of the disclosure. Other embodiments may include additional or fewer components. The illustration of FIG. 4 is not to scale, and may not be illustrated to scale with respect to other figures. The system illustrated in FIG. 4 may include the same container shuttle rail systems discussed with respect to FIGS. 1-3B.

In FIG. 4, a top view of the open space 400 (referenced in FIG. 3A) is depicted. The open space 400 may be an area that allows for free motion or non-rail supported movement by shuttles. Shuttles may enter the open space 400 and follow a path designated by energized linear synchronous motors to exit the open space 400 at a particular location (which may include reengaging a set of rails).

For example, a shuttle may enter the open space 400 from a first path 410 and may exit at any of an optional second path 428, a third path 430, a fourth path 432, a fifth path 420, a sixth path 422, a seventh path 424, an optional eighth path 426, and so forth. Any number of paths may be included. The second path 428 and eighth path 426 may be optional due to the angle with respect to the first path 410.

To move from the first path 410 to the third path 430, electromagnets 480 arranged between the first path 410 and third path 430 may be energized in sequence, such that the shuttle is propelled along the electromagnets 480 until the third path 430 is reached. The shuttle may include a wide magnet array to accommodate the change in direction between the first path 410 and the third path 430.

To move from the first path 410 to the fourth path 432, electromagnets 490 arranged between the first path 410 and fourth path 432 may be energized in sequence, such that the shuttle is propelled along the electromagnets 490 until the fourth path 432 is reached. The shuttle may include a wide magnet array to accommodate the change in direction between the first path 410 and the fourth path 432.

To move from the first path 410 to the fifth path 420, electromagnets 450 arranged between the first path 410 and fifth path 420 may be energized in sequence, such that the shuttle is propelled along the electromagnets 450 until the fifth path 420 is reached. The shuttle may include a wide magnet array to accommodate the change in direction between the first path 410 and the fifth path 420. The fifth path 420 may be in a straight direction aligned with the first path 410.

To move from the first path 410 to the sixth path 422, electromagnets 460 arranged between the first path 410 and sixth path 422 may be energized in sequence, such that the shuttle is propelled along the electromagnets 460 until the sixth path 422 is reached. The shuttle may include a wide magnet array to accommodate the change in direction between the first path 410 and the sixth path 422.

To move from the first path 410 to the seventh path 424, electromagnets 470 arranged between the first path 410 and seventh path 424 may be energized in sequence, such that the shuttle is propelled along the electromagnets 460 until the seventh path 424 is reached. The shuttle may include a wide magnet array to accommodate the change in direction between the first path 410 and the seventh path 424. Additional electromagnets may be included to move between the first path 410 and the second path 428, and the first path 410 and the eighth path 426.

Accordingly, embodiments may include a system for shuttle transportation, where the system includes a first linear synchronous motor arranged in a first orientation, and a second linear synchronous motor arranged in a second orientation that is offset with respect to the first linear synchronous motor. The first linear synchronous motor and the second linear synchronous motor may be disposed along an open floor space. The first direction may be perpendicular to the second direction in some instances. In other instances, the second direction may be a diagonal with respect to the first direction.

Shuttles may be configured to be propelled in a first direction via the first linear synchronous motor and the permanent magnet, and to be propelled in a second direction via the second linear synchronous motor and the permanent magnet.

As depicted in FIG. 4, embodiments may include a system for shuttle transportation, where the system includes a first linear synchronous motor arranged at a first angle, a second linear synchronous motor arranged at a second angle, and a shuttle. The shuttle may include a permanent magnet and a plurality of spherical wheels. The shuttle may be configured to be propelled in a first direction via the first linear synchronous motor and the permanent magnet, and to be propelled in a second direction via the second linear synchronous motor and the permanent magnet. Although discussed in terms of electromagnetic propulsion, other propulsion systems, such as magnetic levitation, may be used.

Figure 5:
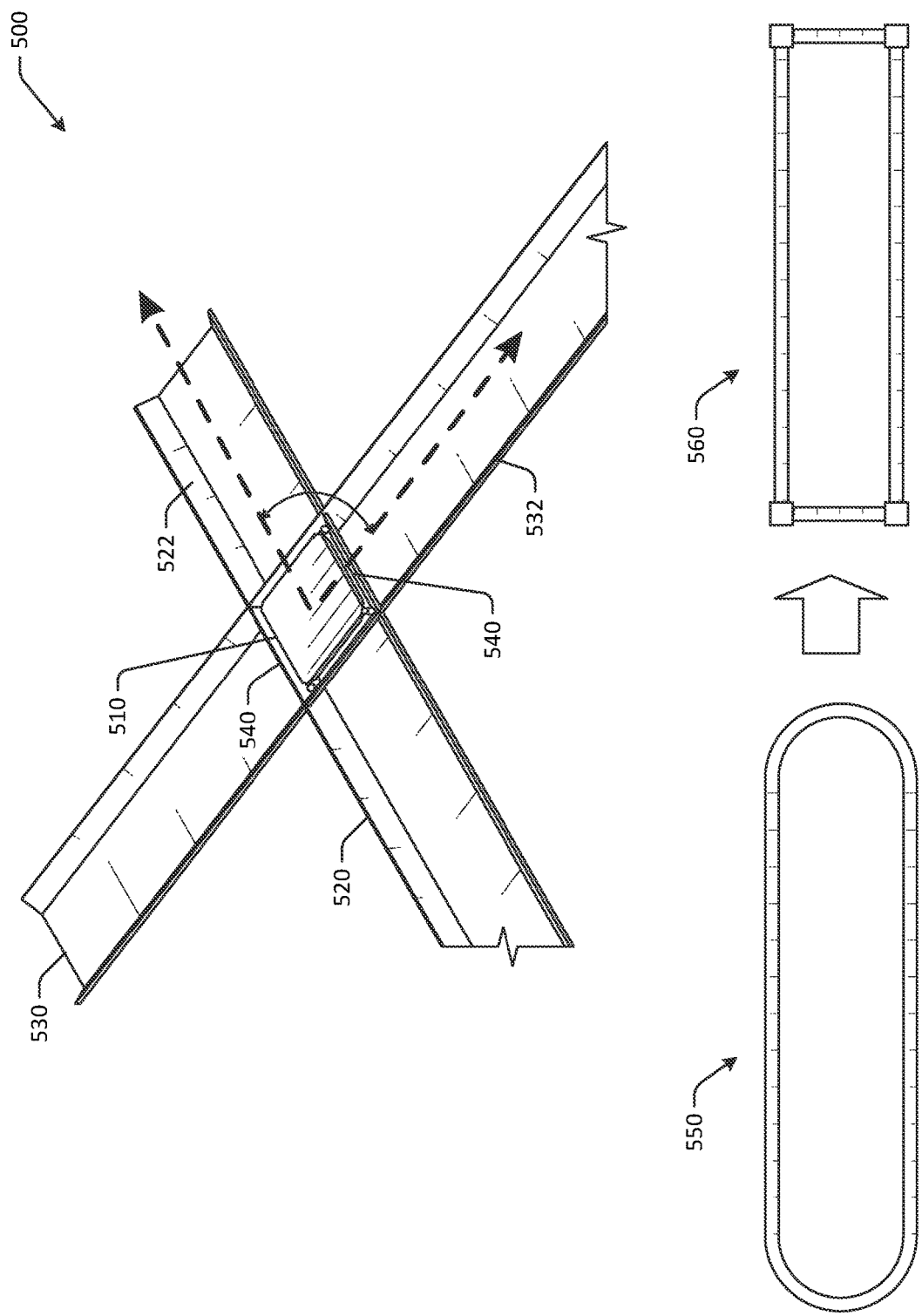
FIG. 5 is a schematic illustration of an orthogonal shuttle rail intersection in accordance with one or more embodiments of the disclosure.

FIG. 5 is a schematic illustration of an orthogonal shuttle rail intersection 500 in accordance with one or more embodiments of the disclosure. Other embodiments may include additional or fewer components. The illustration of FIG. 5 is not to scale, and may not be illustrated to scale with respect to other figures. The system illustrated in FIG. 5 may be used with same container shuttles having omnidirectional wheels discussed with respect to FIGS. 1-4.

In FIG. 5, the orthogonal shuttle rail intersection 500 may be formed by one set of rails (or one track) that intersects another set of rails (or another track). For example, a first track 520 may be intersected by a second track 530. The tracks may intersect at a 90 degree angle. The first track 520 may have angled sidewalls 522 that are oriented at a first angle, and the second track 530 may have angled sidewalls 532 that are oriented at a second angle. The first angle and the second angle may be the same or different angles. In either instance, the omnidirectional wheels may engage the respective angled surfaces without reconfiguration.

A shuttle 510 may be configured to move from the first track 520 to the second track 530 at the orthogonal shuttle rail intersection 500. The shuttle 510 may have omnidirectional wheels, thereby allowing the shuttle 510 to move from the first track 520 to the second track 530 without rotation. For example, the shuttle 510 may move along the first track 520, and then move laterally along the second track 530 without having to rotate wheels, rotate the shuttle, and so forth.

In some embodiments, to facilitate the 90 degree turn of the shuttle 510, the orthogonal shuttle rail intersection 500 may include one or more retractable portions 540 that guide the shuttle 510 onto a desired track. For example, if the retractable portions 540 are in the extended position depicted in the example of FIG. 5, the shuttle 510 may be prevented from moving from the first track 520 to the second track 530, and instead may continue along the first track 520. If the retractable portions 540 were retracted, the shuttle 510 may move from the first track 520 to the second track 530. In other embodiments, electromagnets disposed along the first track 520 and/or the second track 530 may be selectively energized to guide the shuttle 510 along a certain path. The shuttle 510 may include a permanent magnet arrangement such as those described with respect to FIGS. 6-7.

As depicted in FIG. 5, in contrast to a curved rail set 550, which may include curved turns to turn a shuttle 90 degrees, a rectangular rail set 560 as described herein can be utilized, where shuttles can turn without curved rail segments. The rectangular rail set 560 may have a relatively smaller footprint facilitated by the lateral travel of the shuttle 510. This provides additional flexibility when designing for facilities with limited space.

Embodiments may therefore include electromagnets disposed along tracks, where a first linear synchronous motor is disposed along the first track 520, and a second linear synchronous motor is disposed along the second track 530 that is perpendicular to the first track. The first track 520 may optionally include rails having a first incline angle, and the second track 530 may optionally include rails having a second incline angle that is the same or different than the first incline angle.

Figure 6:
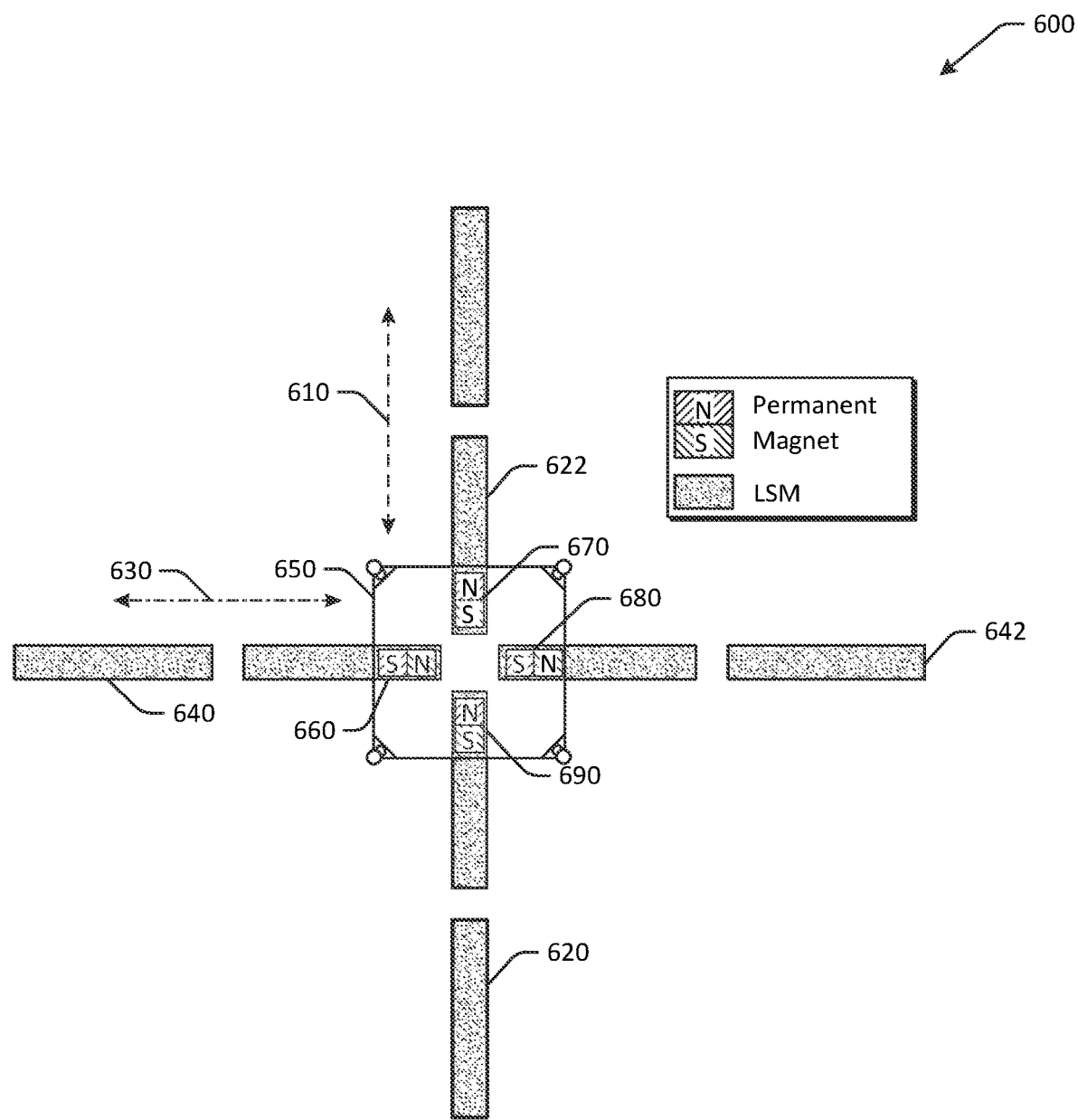
FIG. 6 is a schematic illustration of an example container shuttle having more than one permanent magnet in accordance with one or more embodiments of the disclosure.

FIG. 6 is a schematic illustration of an example container shuttle having more than one permanent magnet in accordance with one or more embodiments of the disclosure. Other embodiments may include additional or fewer components. The illustration of FIG. 6 is not to scale, and may not be illustrated to scale with respect to other figures. The system illustrated in FIG. 6 may be used with and/or may include the same container shuttles having omnidirectional wheels discussed with respect to FIGS. 1-5.

In some instances, shuttles may slow to a stop or near stop and then execute a 90 degree turn. In such instances, shuttles may be propelled by linear synchronous motors arranged perpendicularly. To interact with such linear synchronous motors, shuttles may include more than one permanent magnet. For example, a shuttle may include a first permanent magnet arranged in a first orientation, and a second permanent magnet arranged in a second orientation that is perpendicular to the first orientation. In this manner, the shuttle can use the first permanent magnet for propulsion in a first direction, and the second permanent magnet for propulsion in a second direction that is perpendicular to the first direction.

In FIG. 6, a shuttle 650 is depicted in top view moving along a number of linear synchronous motors disposed along a first axis and a second axis. A first set of linear synchronous motors (including a first linear synchronous motor 620 and a second linear synchronous motor 622) may be arranged in a first orientation 610 along a first track, and a second set of linear synchronous motors (including a third linear synchronous motor 640 and a fourth linear synchronous motor 642) may be arranged in a second orientation 630 along a second track. The first orientation may be perpendicular to the second orientation.

The shuttle 650 may include two or more permanent magnets. For example, the shuttle 650 may include a first permanent magnet 660, a second permanent magnet 670, a third permanent magnet 680, and a fourth permanent magnet 690. Other embodiments may include two permanent magnets, such as the first permanent magnet 660 and the second permanent magnet 670.

The permanent magnets may be arranged so as to provide the ability for the shuttle 650 to move in perpendicular directions. For example, to move along the first direction 610, the second permanent magnet 670 and the fourth permanent magnet 690 may interact with the linear synchronous motors disposed along the first track, and to move perpendicularly in the second direction 630, the first permanent magnet 660 and the third permanent magnet 680 may interact with the linear synchronous motors disposed along the second track.

The respective permanent magnets may be oriented in a complimentary manner For example, the second permanent magnet 670 may be oriented with its north pole adjacent to an edge of the shuttle 650, and the fourth permanent magnet 690 may be oriented with its south pole adjacent to an edge of the shuttle 650. The second permanent magnet 670 and the fourth permanent magnet 690 may be aligned along a central axis of the shuttle 650.

Similarly, the first permanent magnet 660 may be oriented with its south pole adjacent to an edge of the shuttle 650, and the third permanent magnet 680 may be oriented with its north pole adjacent to an edge of the shuttle 650. The first permanent magnet 660 and the third permanent magnet 680 may be aligned along a central axis of the shuttle 650. In some embodiments, the permanent magnets may have a length that is greater than half a width of the shuttle 650, whereas in other embodiments, the permanent magnets may have a length that is less than or equal to half a width of the shuttle 650. The lengths of the permanent magnets may depend on the number of permanent magnets coupled to the shuttle 650. For example, if four permanent magnets are coupled to the shuttle 650, the lengths of the individual permanent magnets may be less than if two permanent magnets are coupled to the shuttle 650.

Figure 7:
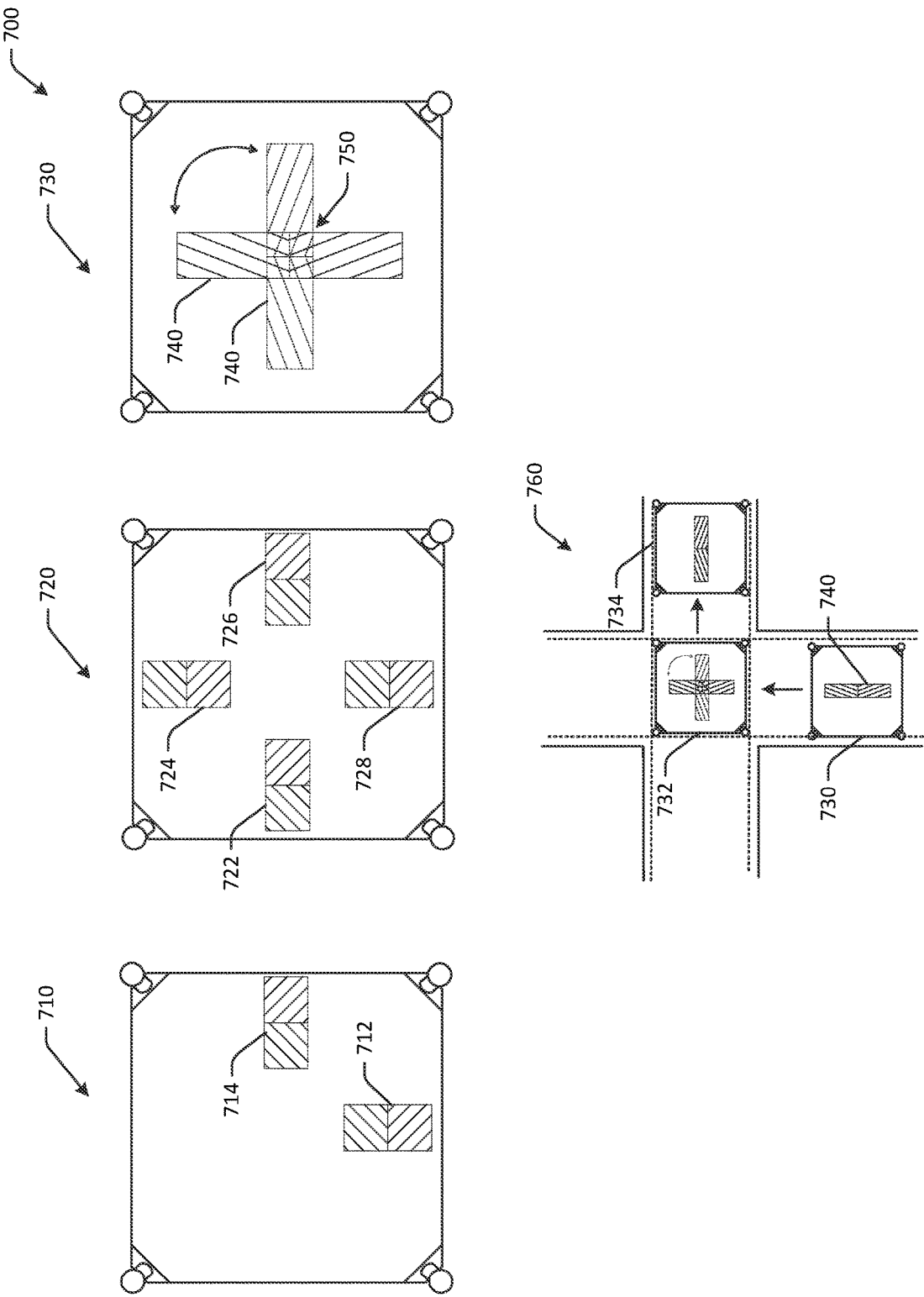
FIG. 7 is a schematic illustration of an example container shuttle with various permanent magnet configurations in accordance with one or more embodiments of the disclosure.

FIG. 7 is a schematic illustration of an example container shuttle with various permanent magnet configurations 700 in accordance with one or more embodiments of the disclosure. Other embodiments may include additional or fewer components. The illustration of FIG. 7 is not to scale, and may not be illustrated to scale with respect to other figures. The components illustrated in FIG. 7 may be used with the container shuttle systems discussed with respect to FIGS. 1-6.

Embodiments include systems and methods for orthogonal shuttle direction changes by placing permanent magnets oriented along two orthogonal directions. Shuttles can ride on a set of omnidirectional caster wheels so that the axis of rotation of the wheel is not fixed. The omnidirectional wheels can be passive, allowing the shuttles to move in the direction of applied thrust. Electromagnets can be arranged in series at the same plane. However, when an orthogonal transition is required, another series of electromagnets can be oriented in the same plane. The shuttle can travel along the first series of electromagnets and the position and speed of the shuttle may be controlled by modulating the magnetic field that engages with permanent magnets aligned in its direction. At the transition, the shuttle can be accurately aligned to transition point, such that the second set of permanent magnets are aligned with second set of electromagnets that are placed orthogonally. Then the first set of electromagnets are turned off second set of magnets are modulated. The engagement of second set of permanent magnets and the electromagnets propels the shuttles in orthogonal direction.

In FIG. 7, a number of different permanent magnet configurations for shuttles are depicted. In a first embodiment 710, a shuttle may include a first permanent magnet 712 and a second permanent magnet 714. The first permanent magnet 712 may be disposed perpendicular to the second permanent magnet 714. The first permanent magnet 712 and the second permanent magnet 714 may be disposed along respective central axes of the shuttle, as depicted in the top view presented in FIG. 7. The first permanent magnet 712 may be used to move the shuttle in a first direction, and the second permanent magnet 714 may be used to move the shuttle in a second direction that is perpendicular to the first direction.

In a second embodiment 720, a shuttle may include a first permanent magnet 722, a second permanent magnet 724, a third permanent magnet 726, and a fourth permanent magnet 728. The first permanent magnet 722 and the third permanent magnet 726 may be disposed along the same axis, and may be disposed perpendicular to the second permanent magnet 724 and the fourth permanent magnet 728. The sets of permanent magnets may be disposed along respective central axes of the shuttle, as depicted in the top view presented in FIG. 7. The first permanent magnet 722 and the third permanent magnet 726 may be used to move the shuttle in a first direction, and the second permanent magnet 724 and the fourth permanent magnet 728 may be used to move the shuttle in a second direction that is perpendicular to the first direction.

Accordingly, the shuttle of the first embodiment 710 and the second embodiment 720 may be part of a system for shuttle transportation that includes a first linear synchronous motor arranged in a first orientation, a second linear synchronous motor arranged in a second orientation that is transverse to the first orientation, and the shuttle. The shuttle may include a first permanent magnet coupled to the shuttle and a second permanent magnet coupled to the shuttle, where the first permanent magnet is arranged parallel to the first orientation and the second permanent magnet is arranged parallel to the second orientation. The shuttle may be configured to be propelled in a first direction via the first linear synchronous motor and the first permanent magnet, and to be propelled in a second direction via the second linear synchronous motor and the second linear synchronous motor. The first direction may be perpendicular to the second direction. In some embodiments, the shuttle may not have an onboard power source. The first linear synchronous motor may be perpendicular to the second linear synchronous motor, and the first permanent magnet may be perpendicular to the second permanent magnet.

In some embodiments, such as the second embodiment 720, the shuttle may include a third permanent magnet coupled to the shuttle and aligned with the first permanent magnet, and a fourth permanent magnet coupled to the shuttle and aligned with the second permanent magnet. The first permanent magnet may be disposed adjacent to a first side of the shuttle, the second permanent magnet may be disposed adjacent to a second side of the shuttle, the third permanent magnet may be disposed adjacent to a third side of the shuttle, and the fourth permanent magnet may be disposed adjacent to a fourth side of the shuttle.

A north pole of the first permanent magnet may be disposed adjacent to the first side of the shuttle, a north pole of the second permanent magnet may be disposed adjacent to the second side of the shuttle, a south pole of the third permanent magnet may be disposed adjacent to the third side of the shuttle, and a south pole of the fourth permanent magnet may be disposed adjacent to the fourth side of the shuttle.

In a third embodiment 730, instead of multiple permanent magnets, the shuttle may include a rotatable permanent magnet 740. The rotatable permanent magnet 740 may be configured to rotate about a center 750 of the shuttle. The rotatable permanent magnet 740 may engage with a first set of electromagnets in a first orientation, and then may rotate to engage with a second set of electromagnets in a second orientation. The third embodiment 730 may be slightly slower to turn than the other embodiments, due to the time needed to rotate the rotatable permanent magnet 740. The rotatable permanent magnet 740 may reciprocate or rotate continuously in a clockwise or counter-clockwise direction.

Embodiments with the rotatable permanent magnet 740 that are active rotatable permanent magnets (e.g., the shuttle powers the rotation of the rotatable permanent magnet 740, etc.) may include an onboard power source in some instances to power the rotation mechanism. In embodiments with the rotatable permanent magnet 740 that are passive rotatable permanent magnets (e.g., rotation of the rotatable permanent magnet 740 may be triggered by a mechanism coupled to a track or rails, etc.) may not include an onboard power source in some instances.

In some embodiments, the permanent magnet may have a first width that is at least half a second width of the shuttle, such as that illustrated in the third embodiment 730. The shuttle may include a coupling mechanism that is configured to rotate the permanent magnet at least 90 degrees.

During operation 760, the third embodiment 730 of the shuttle may move along a first track with the rotatable permanent magnet 740 in a first orientation. At an orthogonal track intersection 732, the rotatable permanent magnet 740 may be rotated, and the shuttle may continue moving in an orthogonal direction with the rotatable permanent magnet 740 rotated 90 degrees 734.

Accordingly, embodiments of a system for shuttle transportation may include a first linear synchronous motor arranged in a first orientation, a second linear synchronous motor arranged in a second orientation that is transverse to the first orientation, and a shuttle. The shuttle may include a rotatable permanent magnet coupled to the shuttle, where the rotatable permanent magnet is configured to rotate from a first orientation to a second orientation. The shuttle may be configured to be propelled in a first direction via the first linear synchronous motor and the permanent magnet in the first orientation, and to be propelled in a second direction via the second linear synchronous motor and the permanent magnet in the second orientation. The shuttle may include a coupling mechanism that is configured to rotate the rotatable permanent magnet at least 90 degrees. The coupling mechanism may be disposed at or near the center 750 of the shuttle.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
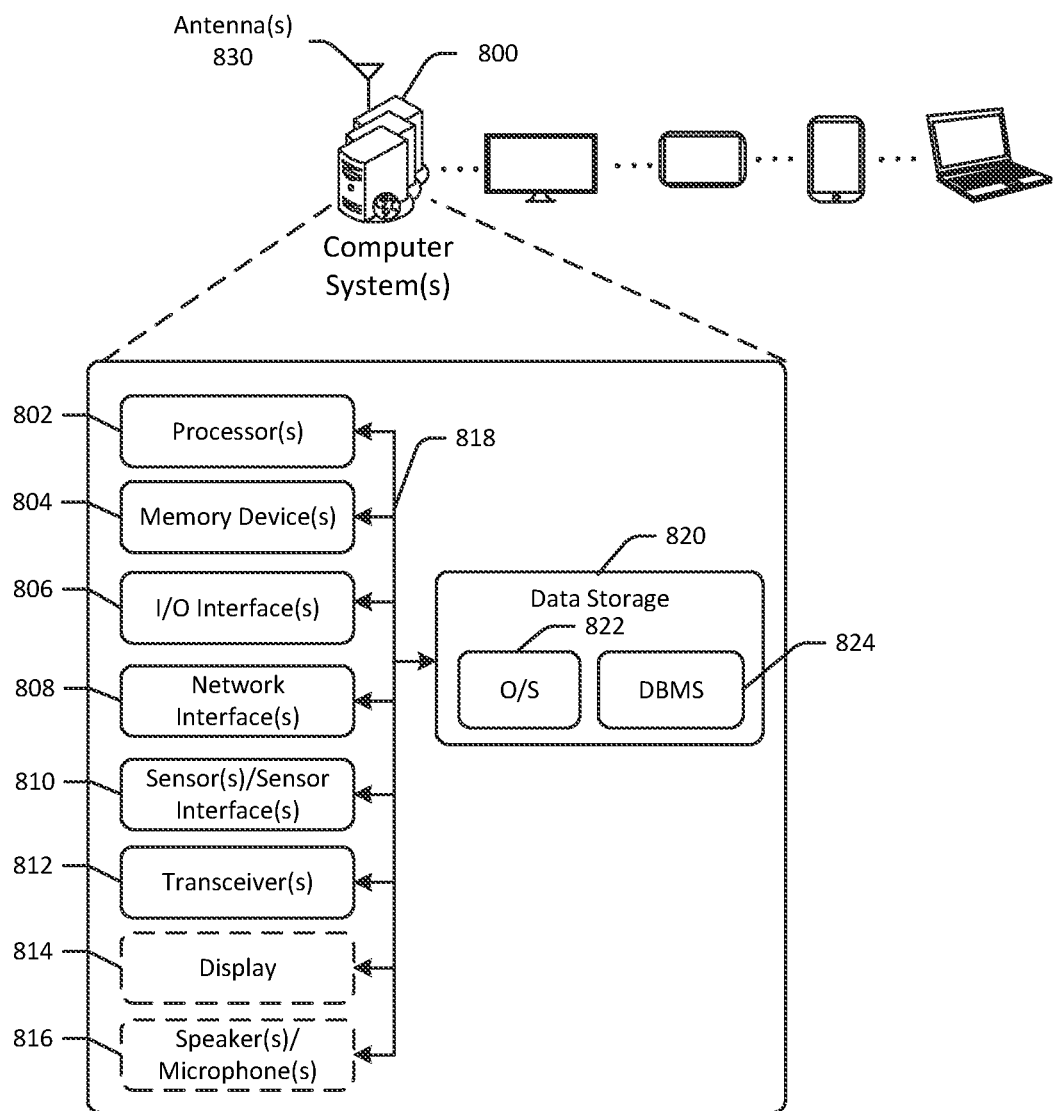
FIG. 8 schematically illustrates an example architecture of a computer system associated with a container shuttle system in accordance with one or more embodiments of the disclosure.

FIG. 8 is a schematic block diagram of one or more illustrative computer system(s) 800 associated with a container shuttle system in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for the controller(s) of FIGS. 1-7. For example, the computer system(s) 800 may be a controller and may control one or more aspects of the container shuttle systems described in FIGS. 1-7.

The computer system(s) 800 may be configured to communicate with one or more servers, user devices, or the like. The computer system(s) 800 may be configured to control electromagnet operation, identify shuttles, direct shuttles, move shuttles, control permanent magnet positioning, and so forth.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna(s) 830. Non-limiting examples of suitable antenna(s) may include directional antenna(s), non-directional antenna(s), dipole antenna(s), folded dipole antenna(s), patch antenna(s), multiple-input multiple-output (MIMO) antenna(s), or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 830—transmitting or receiving radio frequency (RF) signals in the bandwidth and/or channels corresponding to the communications protocols utilized by the computer system(s) 800 to communicate with other devices. The transceiver(s) 812 may include hardware, software, and/or firmware for modulating, transmitting, or receiving—potentially in cooperation with any of antenna(s) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computer system(s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may,"

unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
a first track having a first incline angle;
a second track coupled to the first track, the second track having a second incline angle and arranged perpendicular to the first track;
a first linear synchronous motor arranged in a first orientation along the first track;
a second linear synchronous motor arranged in a second orientation along the second track, wherein the second orientation is perpendicular to the first orientation; and
a shuttle configured to transport individual items from a first location to a second location using the first track and the second track, wherein the shuttle is configured to move directly from the first track to the second track, the shuttle comprising:
a shuttle comprising a first permanent magnet coupled to the shuttle, wherein the first permanent magnet is arranged parallel to the first orientation; and
a second permanent magnet coupled to the shuttle, wherein the second permanent magnet is arranged parallel to the second orientation;
wherein the shuttle is configured to be propelled in a first direction via the first linear synchronous motor and the first permanent magnet, and to be propelled in a second direction via the second linear synchronous motor and the second permanent magnet, wherein the first direction is perpendicular to the second direction.

2. The system of claim 1, wherein the shuttle further comprises:
at least three omnidirectional wheels configured to engage the first track and the second track.

3. The system of claim 1, wherein the shuttle further comprises:
a third permanent magnet coupled to the shuttle and aligned with the first permanent magnet; and
a fourth permanent magnet coupled to the shuttle and aligned with the second permanent magnet;
wherein the first permanent magnet is disposed adjacent to a first side of the shuttle, the second permanent magnet is disposed adjacent to a second side of the shuttle, the third permanent magnet is disposed adjacent to a third side of the shuttle, and the fourth permanent magnet is disposed adjacent to a fourth side of the shuttle.

4. The system of claim 3, wherein a north pole of the first permanent magnet is disposed adjacent to the first side of the shuttle, a north pole of the second permanent magnet is disposed adjacent to the second side of the shuttle, a south pole of the third permanent magnet is disposed adjacent to the third side of the shuttle, and a south pole of the fourth permanent magnet is disposed adjacent to the fourth side of the shuttle.

5. A system for shuttle transportation, the system comprising:
a first linear synchronous motor arranged in a first orientation;
a second linear synchronous motor arranged in a second orientation that is transverse to the first orientation; and
a shuttle comprising a first permanent magnet and a second permanent magnet, wherein the first permanent magnet is arranged parallel to the first orientation and the second permanent magnet is arranged parallel to the second orientation;
wherein the shuttle is configured to be propelled in a first direction via the first linear synchronous motor and the first permanent magnet, and to be propelled in a second direction via the second linear synchronous motor and the second permanent magnet.

6. The system of claim 5, wherein the first linear synchronous motor is perpendicular to the second linear synchronous motor; and
wherein the first permanent magnet is perpendicular to the second permanent magnet.

7. The system of claim 5, wherein the first direction is perpendicular to the second direction.

8. The system of claim 5, wherein the shuttle further comprises at least three omnidirectional wheels.

9. The system of claim 8, further comprising:
a first track having a first incline angle configured to support the at least three omnidirectional wheels; and
a second track having a second incline angle configured to support the at least three omnidirectional wheels;
wherein the at least three omnidirectional wheels are configured to move directly from the first track to the second track.

10. The system of claim 5, wherein the shuttle further comprises at least four omnidirectional wheels.

11. The system of claim 5, wherein the shuttle further comprises:
a third permanent magnet coupled to the shuttle and aligned with the first permanent magnet; and
a fourth permanent magnet coupled to the shuttle and aligned with the second permanent magnet.

12. The system of claim 11, wherein the first permanent magnet is disposed adjacent to a first side of the shuttle, the second permanent magnet is disposed adjacent to a second side of the shuttle, the third permanent magnet is disposed adjacent to a third side of the shuttle, and the fourth permanent magnet is disposed adjacent to a fourth side of the shuttle.

13. The system of claim 12, wherein a north pole of the first permanent magnet is disposed adjacent to the first side of the shuttle, a north pole of the second permanent magnet is disposed adjacent to the second side of the shuttle, a south pole of the third permanent magnet is disposed adjacent to the third side of the shuttle, and a south pole of the fourth permanent magnet is disposed adjacent to the fourth side of the shuttle.

14. The system of claim 5, wherein the shuttle does not have an onboard power source.

15. A system for shuttle transportation, the system comprising:
a first linear synchronous motor arranged in a first orientation;
a second linear synchronous motor arranged in a second orientation that is transverse to the first orientation; and
a shuttle comprising a rotatable permanent magnet coupled to the shuttle, wherein the rotatable permanent magnet is configured to rotate from a first orientation to a second orientation;

wherein the shuttle is configured to be propelled in a first direction via the first linear synchronous motor and the permanent magnet in the first orientation, and to be propelled in a second direction via the second linear synchronous motor and the permanent magnet in the second orientation.

16. The system of claim 15, wherein the shuttle further comprises:
an active coupling mechanism that is configured to actively rotate the rotatable permanent magnet at least 90 degrees.

17. The system of claim 15, wherein the shuttle further comprises:
a passive coupling mechanism that is configured to passively rotate the rotatable permanent magnet at least 90 degrees responsive to external contact.

18. The system of claim 15, wherein the shuttle further comprises at least three omnidirectional wheels.

19. The system of claim 18, further comprising:
a first track having a first incline angle configured to support the at least three omnidirectional wheels; and
a second track having a second incline angle configured to support the at least three omnidirectional wheels;
wherein the at least three omnidirectional wheels are configured to move directly from the first track to the second track.

20. The system of claim 19, wherein the first track is perpendicular to the second track.

* * * * *